United States Patent
Spahn et al.

(10) Patent No.: US 10,086,775 B2
(45) Date of Patent: Oct. 2, 2018

(54) VEHICLE TAILGATE WITH INTEGRATED SAWHORSE

(71) Applicant: FORD GLOBAL TECHNOLOGIES, LLC, Dearborn, MI (US)

(72) Inventors: Brian Robert Spahn, Plymouth, MI (US); Pattrick Loew, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/266,698

(22) Filed: Sep. 15, 2016

(65) Prior Publication Data

US 2018/0072242 A1 Mar. 15, 2018

(51) Int. Cl.
| | |
|---|---|
| *B60R 11/06* | (2006.01) |
| *B25H 1/06* | (2006.01) |
| *B62D 33/027* | (2006.01) |
| *B25H 1/16* | (2006.01) |
| *B25H 5/00* | (2006.01) |
| *B60R 3/02* | (2006.01) |
| *B60R 11/00* | (2006.01) |

(52) U.S. Cl.
CPC ............... *B60R 11/06* (2013.01); *B25H 1/06* (2013.01); *B25H 1/16* (2013.01); *B25H 5/00* (2013.01); *B60R 3/02* (2013.01); *B62D 33/0273* (2013.01); *B60R 2011/004* (2013.01); *B60R 2011/0045* (2013.01)

(58) Field of Classification Search
CPC ..... B60R 11/06; B62D 33/023; B62D 33/027; B62D 33/0273; B62D 33/03

USPC .......................................... 296/50, 51, 57.1
See application file for complete search history.

(56) References Cited

U.S. PATENT DOCUMENTS

| | | |
|---|---|---|
| 3,245,713 A | 4/1966 | Ogilvie |
| 4,135,761 A | 1/1979 | Ward |
| 4,880,080 A | 11/1989 | Brockman |
| 5,649,734 A | 7/1997 | Speis |
| 5,829,812 A | 11/1998 | Gionta |
| 6,224,127 B1 | 5/2001 | Hodge |
| 6,467,417 B1 | 10/2002 | Guyot et al. |
| 6,641,190 B2 | 11/2003 | Kirchhoff |
| 6,941,655 B1 | 9/2005 | Bisland |
| 8,033,435 B1 | 10/2011 | Brooke |
| 9,669,746 B2 | 6/2017 | Sterling |

(Continued)

FOREIGN PATENT DOCUMENTS

| | | |
|---|---|---|
| EP | 2154022 A1 | 2/2010 |
| WO | 2016028884 A1 | 2/2016 |

OTHER PUBLICATIONS

English Machine Translation of EP2154022A1.

(Continued)

*Primary Examiner* — Jason S Daniels
(74) *Attorney, Agent, or Firm* — Jason Rogers; King & Schickli, PLLC

(57) ABSTRACT

An apparatus for a vehicle including a vehicle tailgate having a recess formed therein. A sawhorse is adapted for positioning in the recess in a stowed position and for being removed for use apart from the vehicle. The sawhorse may include a projecting handle for use in lifting the sawhorse from the recess. The tailgate may also include a retractable ladder or step, which may be arranged for forming an extended bed. Related methods are also disclosed.

15 Claims, 8 Drawing Sheets

(56) References Cited

U.S. PATENT DOCUMENTS

| | | |
|---|---|---|
| 2005/0093339 A1 | 5/2005 | Klassen |
| 2005/0225117 A1 | 10/2005 | Miskech et al. |
| 2007/0114813 A1 | 5/2007 | Salvador et al. |
| 2008/0309110 A1 | 12/2008 | Jones |
| 2009/0160206 A1 | 6/2009 | Pleet |
| 2010/0206666 A1 | 8/2010 | Jeeves |
| 2013/0134733 A1 | 5/2013 | Peters |
| 2014/0021232 A1 | 1/2014 | Lazarevich et al. |
| 2015/0102624 A1 | 4/2015 | Kmita |
| 2016/0031353 A1* | 2/2016 | DeSimone .............. B60P 1/435 296/57.1 |
| 2016/0121801 A1 | 5/2016 | Masih et al. |
| 2016/0288719 A1 | 10/2016 | Sterling |

OTHER PUBLICATIONS

Non-Final Office Action dated Oct. 25, 2017 for U.S. Appl. No. 15/266,625, filed Sep. 15, 2016.
Final Office Action dated May 15, 2018 for U.S. Appl. No. 15/266,625, filed Sep. 15, 2016.

\* cited by examiner

VEHICLE TAILGATE WITH INTEGRATED SAWHORSE

TECHNICAL FIELD

This document relates generally to the motor vehicle field and, more particularly, to a vehicle tailgate with an integrated sawhorse.

BACKGROUND

Trucks may be used for a variety of purposes, including the hauling of construction equipment in the bed. Space in the bed can be at a premium for temporarily storing items to be hauled. Thus, it would be desirable to provide a means of storing items such as saw horses that are useful on the construction site so as to not take up space in the bed, and yet in a manner that permits readily access for use.

Thus, a need is identified for a vehicle with an integrated sawhorse and, in particular, one that can be stowed in the vehicle out of sight or without taking up space for cargo in the bed, and then removed and deployed for use.

SUMMARY

In accordance with the purposes and benefits described herein, the disclosure relates in part to an apparatus for a vehicle. The apparatus comprises a vehicle tailgate having a recess formed therein. A sawhorse is adapted for positioning in the recess in a stowed position and for being removed for use apart from the vehicle.

The recess may be provided in an upper portion of the tailgate when in a lowered position. The sawhorse may form an upper surface of the tailgate. In particular, the sawhorse may comprise a cross member forming an upper surface of the tailgate and a plurality of legs stowable within the cross member. The cross member may be color matched with a surrounding portion of the tailgate. Alternatively or additionally, a cover may be provided for covering the recess, which may be adapted for receiving the sawhorse in a direction transverse to a travel direction of the vehicle and a vertical direction.

In these or other embodiments, the vehicle tailgate includes a retractable ladder. The tailgate may also include an extendable bed. In any embodiment, the sawhorse may include a projecting handle for use in lifting the sawhorse from the recess.

According to a further aspect of the disclosure, a vehicle comprises a collapsible, removable sawhorse forming an integral portion of a vehicle tailgate. The sawhorse includes a cross member and a plurality of legs depending therefrom in a deployed condition of the sawhorse.

In one embodiment, the plurality of legs are pivotally connected to the cross member. At least two of the plurality of legs may be connected by a folding hinge. A recess may be provided for receiving the plurality of legs in a stowed position.

The cross member may form an upper surface of the vehicle tailgate. A cover may also be provided for covering the sawhorse in a stowed condition. The vehicle tailgate may also include a retractable ladder. The sawhorse may also include a projecting handle for use in lifting the sawhorse from the recess.

A further aspect of the disclosure pertains to a method of providing a sawhorse in connection with a vehicle including a bed having a floor for receiving and supporting objects for transport and partially bounded by a tailgate. The method comprises positioning the sawhorse in a recess formed in the tailgate.

In the following description, there are shown and described several preferred embodiments of the vehicle tailgate with an integrated sawhorse. As it should be realized, the arrangement is capable of other, different embodiments and its several details are capable of modification in various, obvious aspects all without departing from the vehicle tailgate with an integrated sawhorse as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle tailgate with an integrated sawhorse and together with the description serve to explain certain principles thereof. In the drawing figures.

Figure 12:
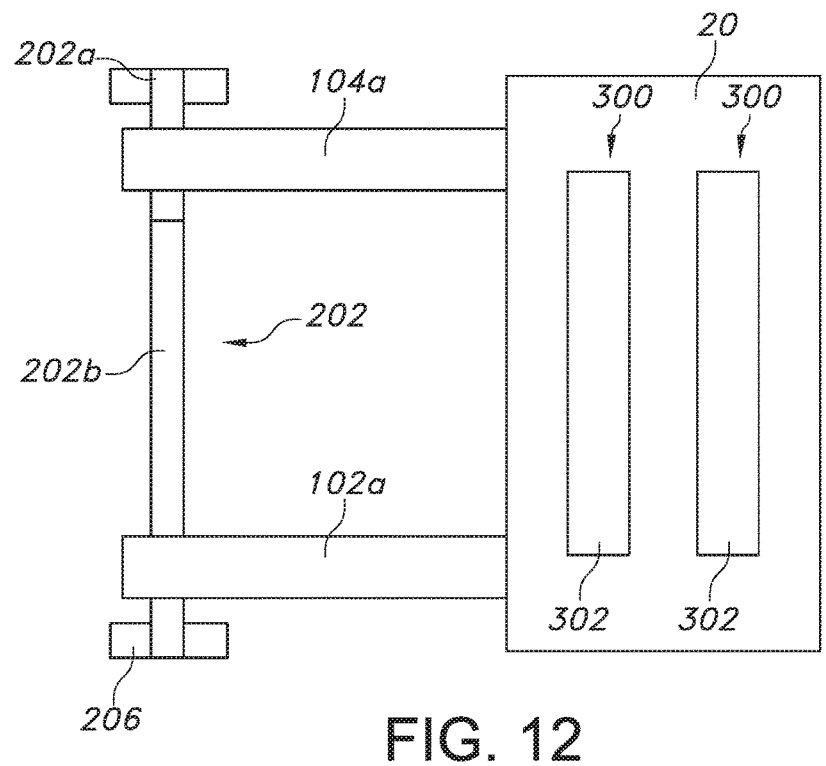
Figure 13:
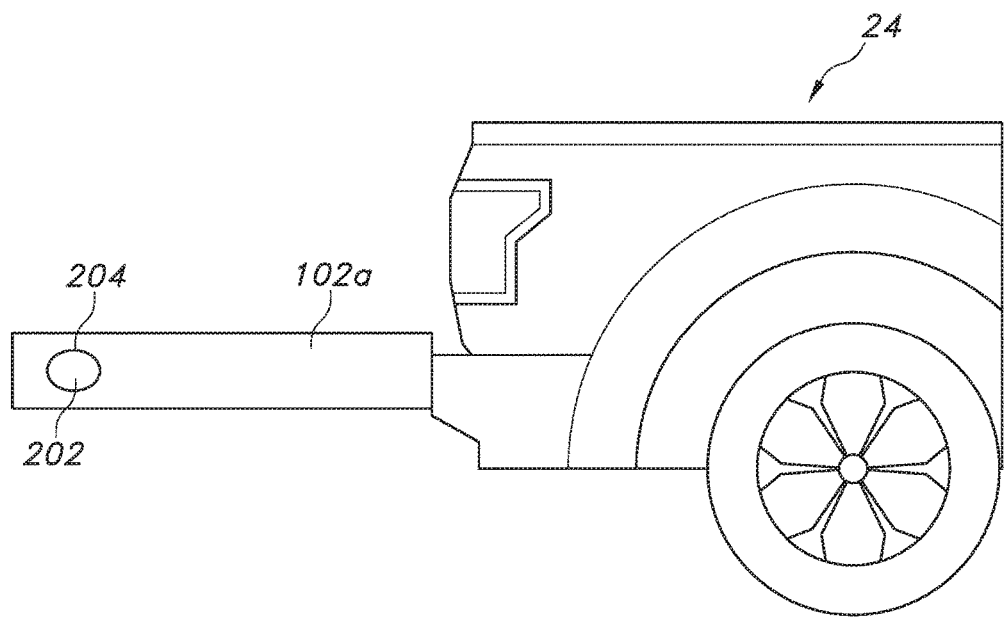
Figure 14:
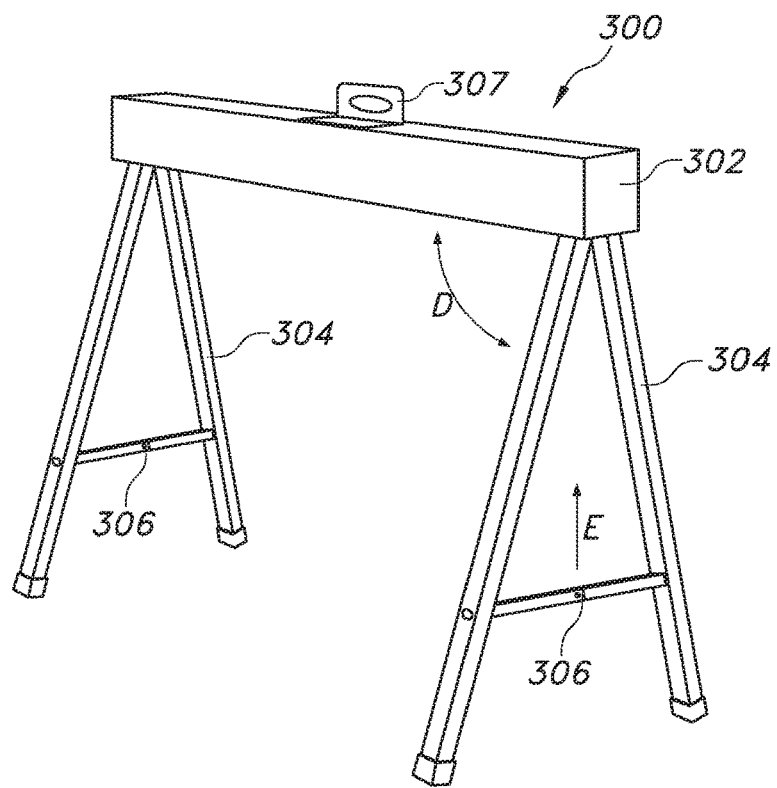
Figure 15:
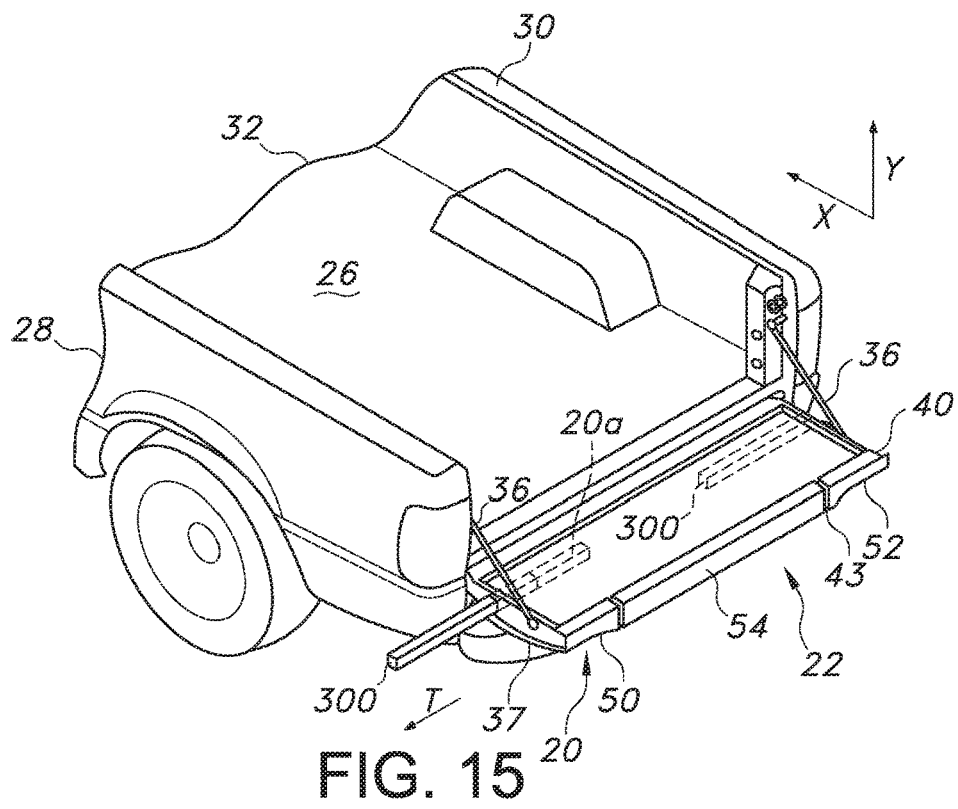

FIGS. 12 and 13 schematically illustrate an alternate embodiment of the retractable bed extender;

FIG. 14 illustrates an embodiment of a collapsible sawhorse for use in connection with a vehicle tailgate; and FIG. 15 illustrates an alternative embodiment of a tailgate including an integrated sawhorse.

Reference will now be made in detail to the present preferred embodiments of the vehicle tailgate with an integrated sawhorse, examples of which are illustrated in the accompanying drawing figures.

DETAILED DESCRIPTION

Figure 1:
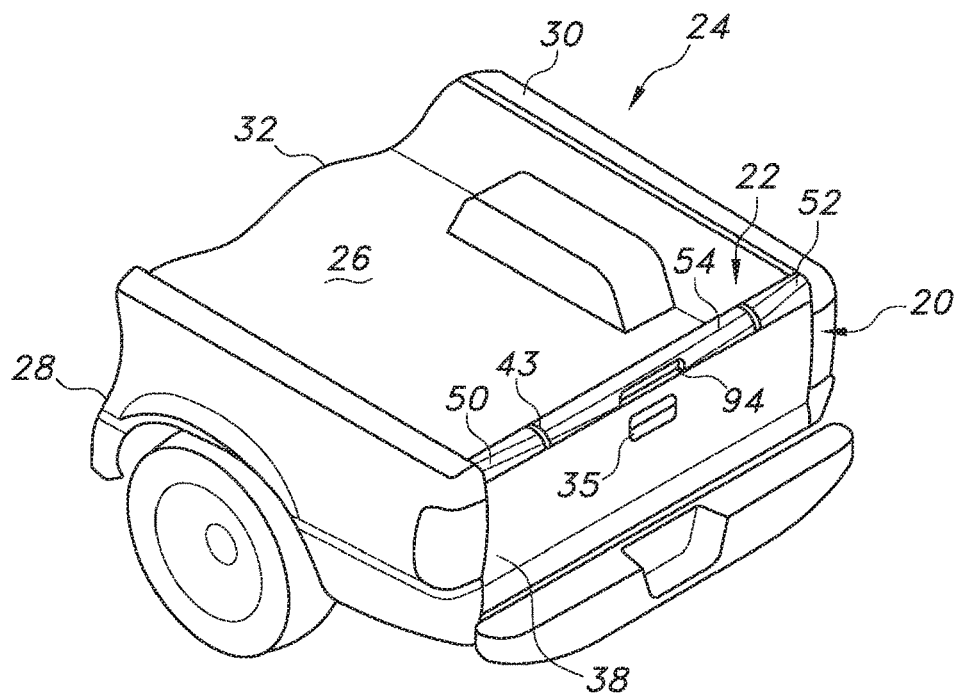
FIG. 1 is a partially cutaway, rear perspective view of a vehicle bed including a tailgate with a ladder in a retracted position.

Reference is now made to FIG. 1, which illustrates a tailgate 20 including a retractable ladder 22. The tailgate 20 is adapted to mount to a vehicle 24, such as a pickup truck. The vehicle 24 includes a storage compartment or bed 26 that is defined by a left rear quarter panel 28, which forms a first vertical surface of the bed 26; a right rear quarter panel 30, which forms a second vertical surface of the bed 26; a floor 32, which extends between the two panels 28, 30; and the tailgate 20.

Figure 3:
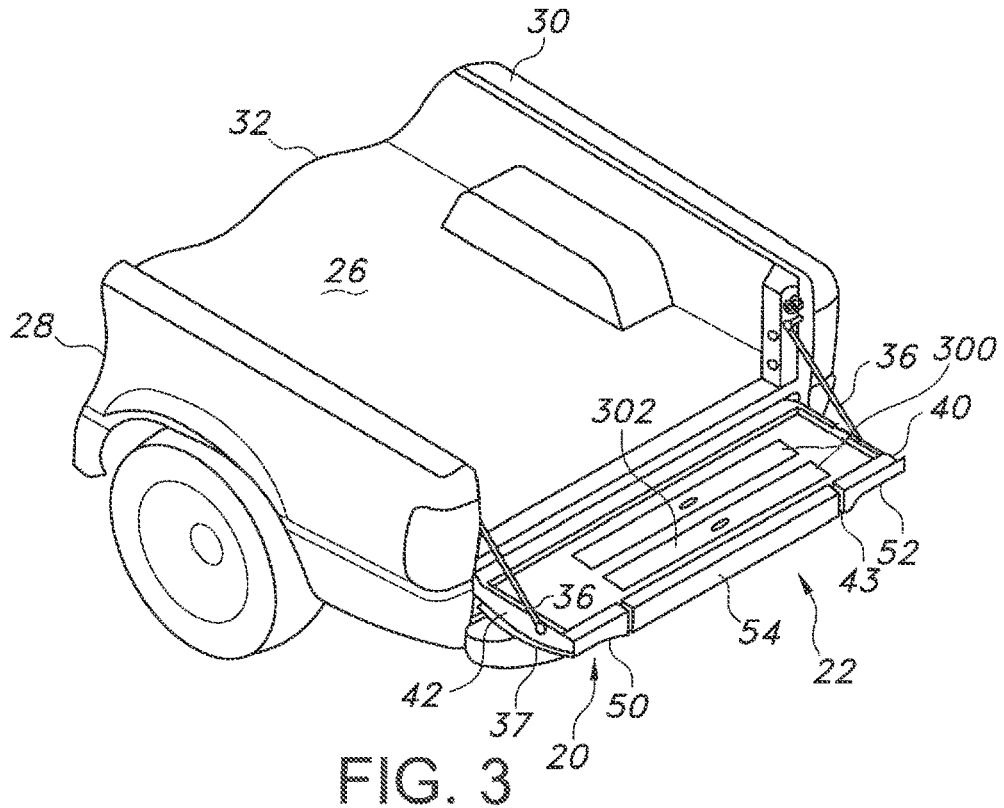
FIG. 3 is a similar view with the tailgate in the lowered position, ready for loading the bed with cargo.

As can be understood by comparing FIGS. 1 and 3, the tailgate 20 may pivot between a generally vertical closed position and a generally horizontal open position to expose and cover an open end of the bed 26. In this regard, and as perhaps best shown in FIG. 9, the tailgate 20 includes a pair of tailgate hinges 34 for cooperating with the side panels 28, 30. A pair of tailgate supports 36 connected to these panels 28, 30 support the tailgate 20 in the lowered or horizontal position. A tailgate handle 35 mounts to an outer panel 38, and functions in a conventional manner. The release mechanism for the tailgate 20, as well as tailgate latches, are conventional and well known in the art and so are not shown in detail.

The tailgate 20 includes a tailgate frame 37, which forms the outer finished surface of the tailgate 20, and an inner panel 40, which mounts to the outer panel 38 and forms the inner surface and sides 42 of the tailgate 20. The outer panel 38 and inner panel 40 combine to form a channel 68. Other tailgate reinforcement members (not shown) and brackets (not shown) may be mounted within the frame 37 to provide structural support to the frame outer and inner panels 38, 40.

A left tailgate molding 50 and a right tailgate molding 52 may form the upper surfaces of the tailgate 20. These moldings 50, 52 help to prevent paint scratches on metal parts when cargo is being loaded over the top of a closed tailgate 20. The moldings 50, 52 may be made of colored plastic that is the desired color of the parts, which eliminates the need to paint them.

Figure 2:
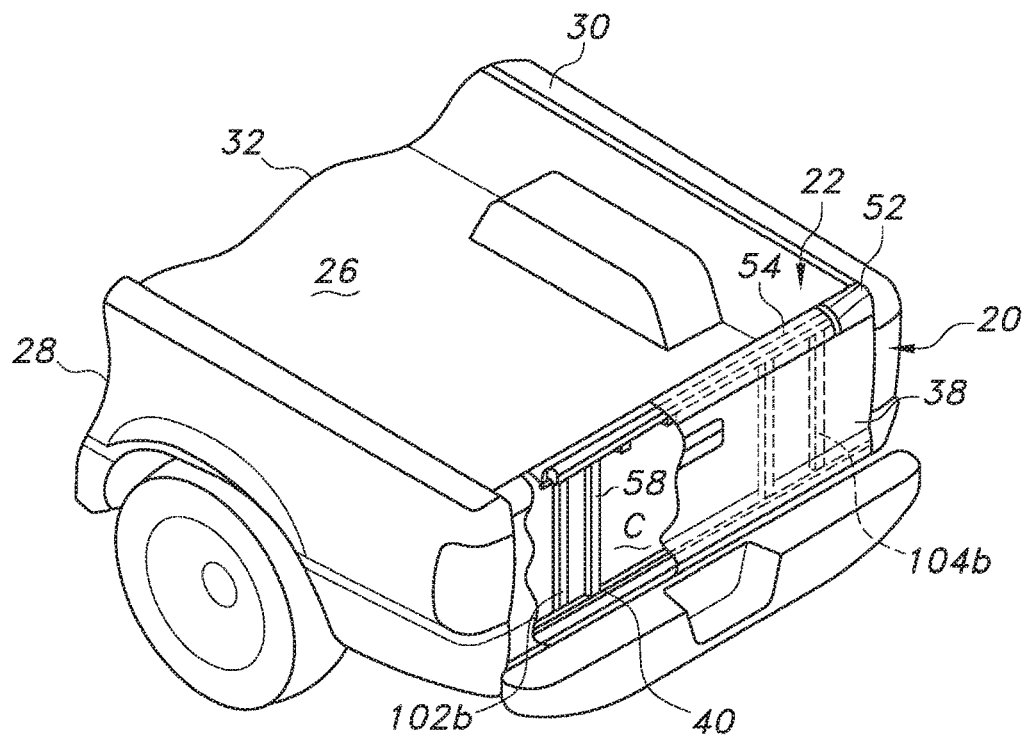
FIG. 2 is a similar view, with a cutaway illustrating an interior portion of the tailgate to show certain of the structures forming the ladder.

The components that make up the tailgate frame 37 are formed so that a hollow internal cavity C is created, as indicated by the partially cutaway view provided in FIG. 2. Within this cavity C, the ladder 22 is retained in the retracted configuration. In one embodiment, the ladder 22 includes a transverse portion 54 (which together with moldings 50, 52 form the upper end surface of the tailgate 20), a movable frame portion 56, and guide rails 58. As can be understood with reference to FIGS. 5 and 6, the guide rails 58 are hollow, generally rectangular tubes fixed to the tailgate frame 37 and support the movable frame portion 56 as it is telescopically extended from and retracted into the guide rails 58.

Each guide rail 58 includes pivot brackets 64 that cooperate with the movable frame portion 56 to allow for both pivoting of the movable frame portion relative to the tailgate 20 and also prevent the movable frame portion from being separated from the guide rails 58. The bottoms of the guide rails 58 may be fastened to the inner panel 40 in order to help secure the guide rails to the tailgate 20.

Figure 5:
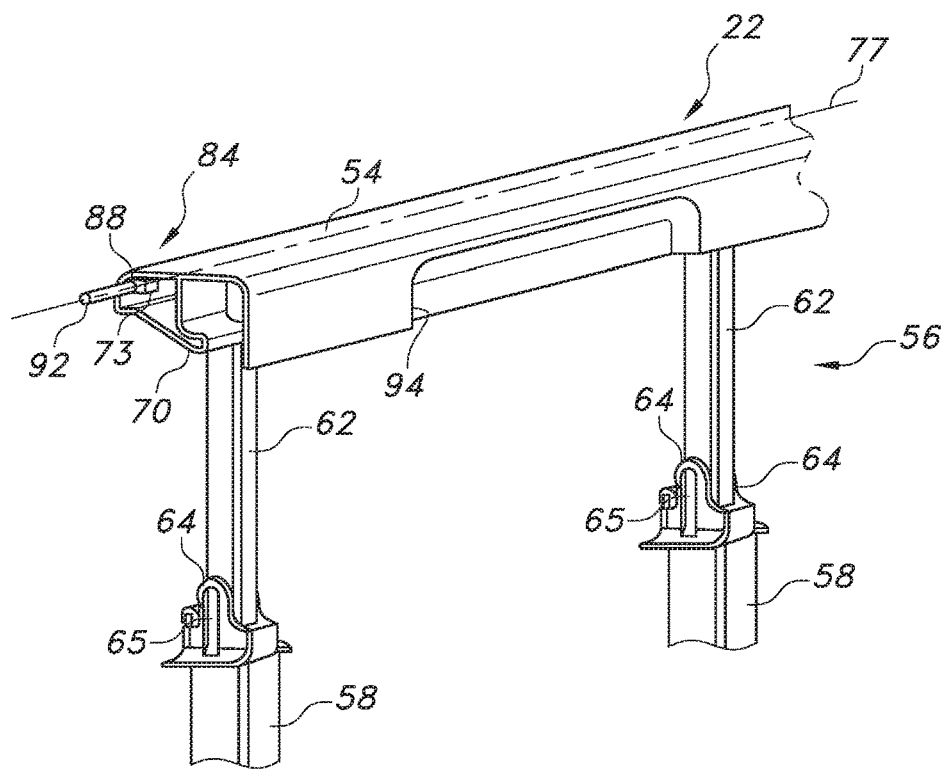
FIG. 5 is a partially cutaway view of a retractable ladder according to one possible embodiment.
Figure 6:
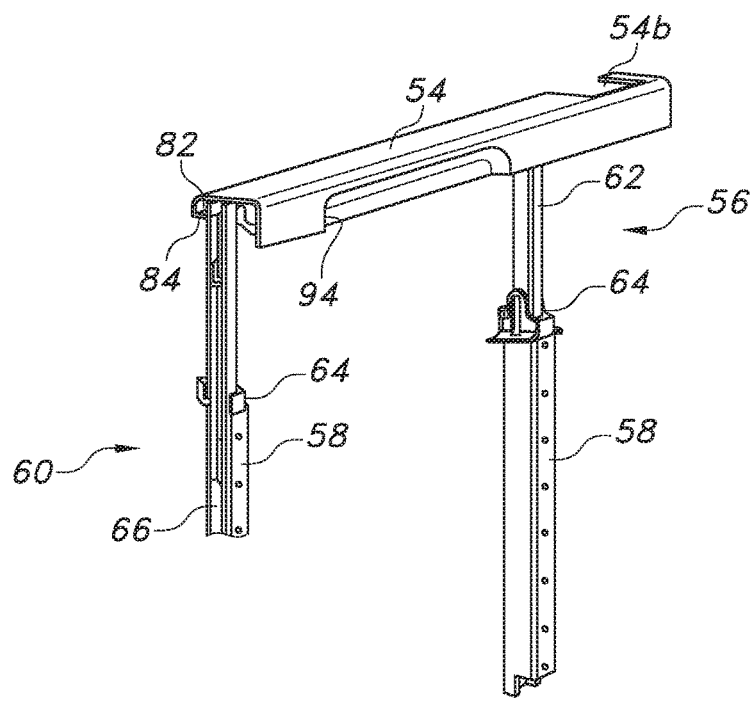
FIG. 6 is a partially cutaway view illustrating the extension and retraction mechanism associated with the ladder.

With continued reference to FIGS. 5 and 6, the movable frame portion 56 includes a pair of supports 62 that may retracted into and extend from the respective guide rail 58. Each support 62 is received telescopically in a respective one of the guide rails 58. As can be further understood from FIG. 8, each of the guide rails 58 may include a block spacer 55 mounted therein against which the supports 62 can slide. The block spacers 55 may be formed of plastic to minimize potential scratching of the supports 62 as they slide relative to the guide rails 58. Each of the supports 62 includes a hinge pin 66 that cooperates with the pivot brackets 64, when fully extended. This allows for pivoting of the movable frame portion 56 relative to the guide rails 58, while still allowing the guide rails to retain and support the supports 62. The hinge pins 66 may be secured to the supports 62 by welding, interference fit, or some other suitable means.

Each of the supports 62 may also connect to a corresponding latching assembly 60. The latching assemblies 60 releasably fix the supports 62 to a certain limited number of telescopically extended positions relative to the guide rails 58. When extended out partially, the guide rails 58 hold the supports 62 parallel, thus creating a longer effective bed for the vehicle 24 when the tailgate 20 is in the horizontal position.

Each of the movable frame portion's supports 62 are hollow for receiving a respective one of the two latching assemblies 60 therein. More specifically, and with further reference to FIG. 8, the latch housings 78 extend through each of the supports 62 and connect, at their upper ends, to the lower ends of latch actuation rods 80 via retainer barrels 81. The upper ends of the latch actuation rods 80 are secured, via retaining clips 83, to release levers 82, which are part of the transverse portion 54, in order to form a releasable connector 84.

The pivot mounts 73 on the support frame 70 connect to and mount the transverse portion 54 about a pivot axis 77. More specifically, the transverse portion 54 may be formed from plastic, or other suitable material, such as, for example, a thirty percent glass filled polypropylene. The release levers 82 may be molded into the transverse portion 54 while it is being formed or affixed thereto after forming by, for example, friction welding. Each release lever 82 includes a base 86 that is adjacent to the transverse portion 54, a pivot flange 88 extending from one end of the base 86, and a release flange 90 extending from the other end. Each pivot flange 88 pivotally mounts about one of the pivot mounts 73 and is secured with a hinge rod 92. The pivot flange 88, then, will allow the transverse portion 54 to pivot about the pivot axis 77. Each release flange 90 is offset from the pivot axis 77 and is connected to one of the latch actuation rods 80. Thus, when the transverse portion 54 is pivoted, the release flanges 90 pull up on the latch actuation rods 80. The latching assemblies 60 unlatch, allowing the supports 62 to slide relative to the guide rails 58, when the latch actuation rods 80 are pulled upwards, and re-engage when the latch actuation rods 80 are released.

The lower ends of the latch housings 78 connect to latch return springs 85, which, in turn, are connected to the hinge pins 66. Also connected to the hinge pins 66 are linear guides 89. The linear guides 89 may include sliders 91, which provide for surface contact with the inside of the guide rails 58. Alternatively, the linear guides and sliders may be replaced with roller guides and rollers (not shown) in order to provide a more smooth feeling motion when extending and retracting the supports 62 relative to the guide rails.

Figure 8:
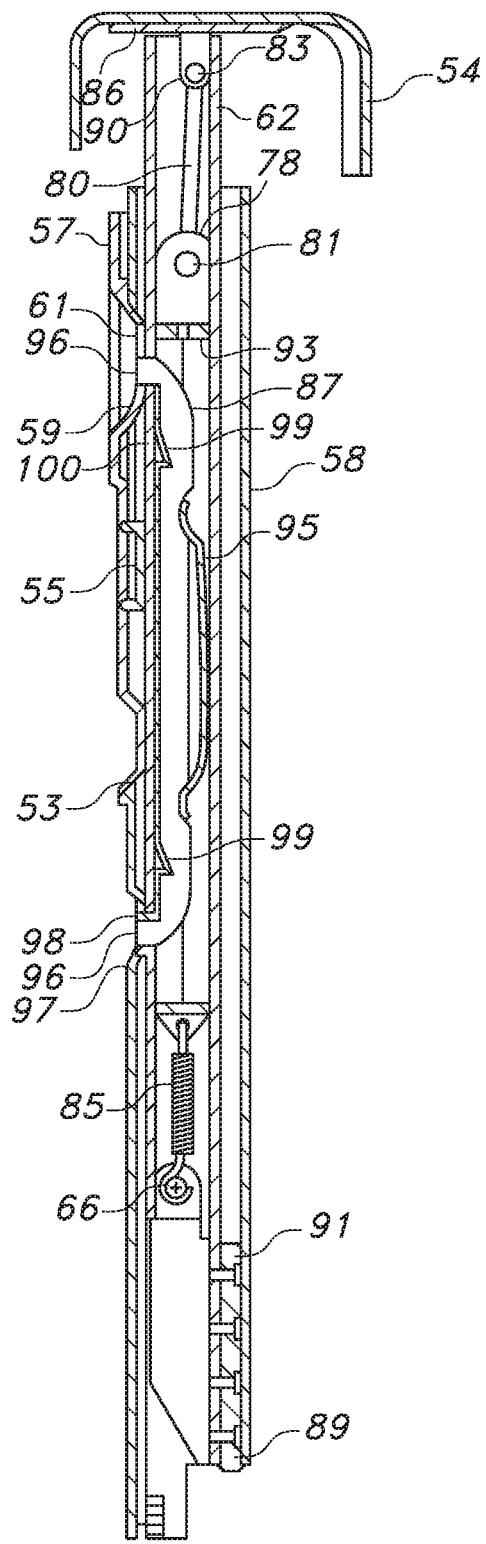
FIG. 8 is a cross-sectional side view of the support arrangement for the ladder according to one embodiment.

With reference to FIGS. 5 and 8, each of the latch housings 78 also includes a longitudinally extending slot 93, within which is mounted a respective one of two latch blades 87. Each latch blade 87 is biased into its corresponding slot 93 by a latch blade spring 95. The springs 95 cause retention tabs 96, protruding from the latch blades 87, to extend through corresponding holes 97 in the supports 62. When aligned, the retention tabs 96 are biased by the springs 95 to extend through engagement slots 98 in the guide rails 58 and through engagement slots 61 in insert plates 59. The insert plates 59 may be secured to their respective guide rails 58 by detent covers 57. The engagement slots 61, 98 may be longer than the width of the corresponding retention tabs 96 and the insert plates 59 adjustable relative to their corresponding detent covers 57 in order to allow for small adjustments in the position of the supports 62 relative to the guide rails 58.

This small adjustability may allow one to make sure that the top of the transverse portion 54 is flush with the tops of the tailgate moldings 50, 52 when the ladder 22 is in its stowed position. Each latch housing 78 also includes internal flanges 99, located within the slot 93, that engage release ramps 100 on the latch blade 87.

To deploy the ladder 22 from its stowed position, the transverse portion 54 may be grasped and pivoted relative to the pivot axis 77. This causes the release flanges 90 to pull on the latch actuation rods 80, which, in turn, pull on the latch housings 78 against the bias of the latch return springs 85. As the latch housings 78 move upward, the internal flanges 99 slide along the release ramps 100, which causes the latch blades 87 to begin sliding against the bias of the latch blade springs 95. As the latch blades 87 slide outward, the retention tabs 96 slide out of the engagement slots 61, 98, thus releasing the movable frame portion 56 and allowing it to slide relative to the guide rails 58. Springs (not shown) may be provided to bias the movable frame portion 56 away from the tailgate frame 37 when the latching assemblies 60 are released.

Further retraction of the transverse portion 54 telescopically slides the supports 62 relative to the guide rails 58, while allowing the transverse portion to pivot back into its latch engaged position. Once the movable frame portion 56 slides out to a predetermined extended position relative to the tailgate 20, the retention tabs 96 on the lower end of the latch blades 87 engage a slot 53 or slot 61 (depending upon how far the supports 62 are slid prior to releasing the transverse portion 54), thus fixing the movable frame portion 56 relative to the guide rails 58. Also, at these extended positions, the supports 62 still remain partially within the guide rails 58 so that the two will not pivot relative to one another. With the tailgate 20 in its horizontal open position, the ladder 22 is now in its bed extender position. While only a limited number of bed extender positions are discussed herein, the ladder 22 may have multiple bed extender positions by providing additional engagement slots, if so desired.

The transverse portion 54 may then be pivoted again to release the latching assemblies 60 once more. One may then pull the ladder 22 out to its fully extended position relative to the open tailgate 20. In this fully extended position, the supports 62 will be pulled out of the guide rails 58, with the hinge pins 66 engaged in the slots 65 of the pivot brackets 64.

Figure 4:
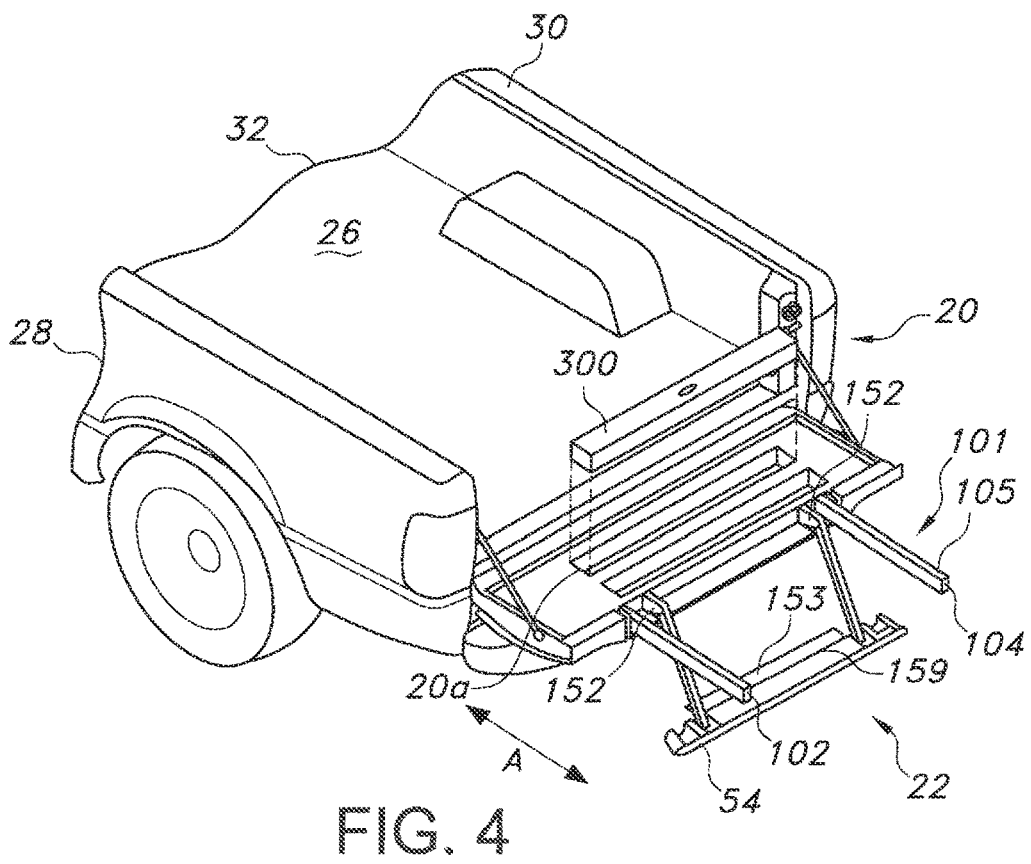
FIG. 4 is a similar view showing a railing formed by extendable rails and a retractable ladder in a lowered position, ready for use in stepping into the bed from the ground.

The movable frame portion 56, from its fully extended position, can be pivoted downward until the supports 62 engage stops 152. The size and location of the stops 152 determines the downward angle at which the supports 62 engage the structural stops 152. This angle can be any angle that is deemed most convenient for positioning of an assist step. After the frame portion 56 is in this downward extending, generally vertical orientation, one then uses a hand or foot to pivot a flip step 153 connected to the transverse portion 54 by a hinge 159 from its closed position resting against the support frame 70 to its open position generally flush and coplanar with the support frame 70 and extending toward the vehicle 24. The ladder 22 is now in its step assist position (as best seen in FIG. 4). The flip step 153 and the support frame 70 act together to form a step that is wide enough to be comfortable for a foot when one is standing thereon. If so desired, one may also provide traction grooves 151 or apply a tape or a similar traction device to the upper surfaces of the support frame 70, flip step 153 or both in order to improve the traction of a person standing on the step.

Figure 7:
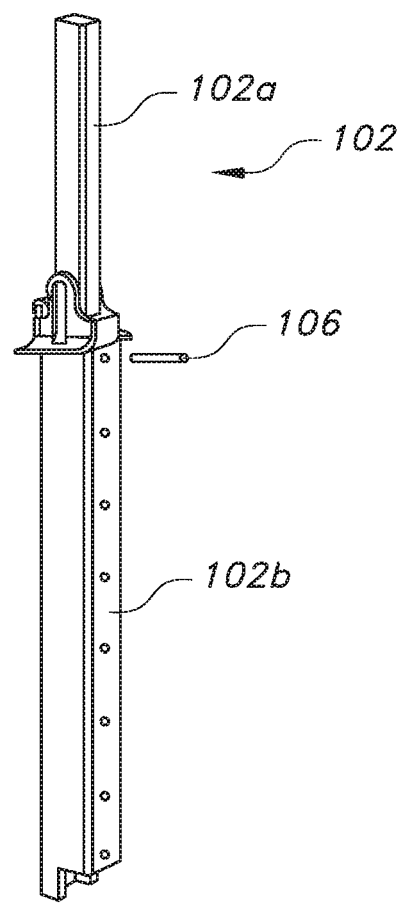
FIG. 7 is a partially cutaway view showing the extension and retraction mechanism associated with each handle forming the railing.

With combined reference to FIG. 4, it can also be understood that the tailgate 20 may include an extendable railing 101 to provide support for a person when using the ladder 22 in the deployed or lowered position. In one embodiment, this railing 101 includes one or more spaced, elongated handles, which in the illustrated embodiment take the form of first and second retractable members 102, 104, one positioned on each side of the ladder 22. These members 102, 104 are adapted for being withdrawn from the tailgate 20 in the active condition, and for returning to a retracted position within it in an inactive condition. As shown in FIG. 7, each member 102 (only one shown) may include an extendable portion 102a that telescopes into another member, such as a tubular receiver 102b, associated with and fixed to the tailgate 20. A suitable locking pin 106 may also be provided for locking the extendable member 102, 104 in the extended and retracted positions.

According to one aspect of the disclosure, the ladder 22 and one or both of the members 102, 104 (if two are present) may be combined to form a retractable bed extender 200 for use in combination with the existing vehicle bed 26. Specifically, with reference to FIG. 9, the extendable portions 102a, 104a of the retractable members 102, 104 forming railing 101 in the extended position may engage the transverse portion 54 of the ladder 22 when in an extended, generally horizontal position. As can be appreciated from FIG. 10, this transverse portion 54 of the ladder 22 may have a corresponding dimension, or width, equal to or greater than the spacing S between the members 102, 104, such that the transverse portion may engage and be supported by the extended portions 102a, 104a when in a similar, substantially horizontal orientation.

Figure 10:
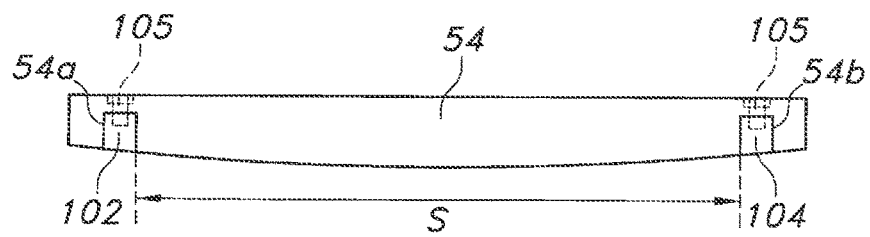
FIG. 10 is an end view of the retractable bed of FIG. 9.

The ladder 22 may be adapted for releasably engaging the portions 102a, 104a of the members 102, 104 in the extended position. Specifically, as shown in FIG. 10, the transverse portion 54 may include one or more receivers, such as openings or cutouts 54a, 54b for receiving the corresponding end portions of the members 102, 104 (such as when pivoted vertically a few degrees). The transverse portion 54 may also include connectors, such as fixed or removable pins 105, for positioning in one or more openings in the extended portions 102a, 104a members 102, 104 to form a secure, but releasable engagement when the bed extender 200 is extended. As should be appreciated, the arrangement may be reversed with the same result, with the connectors or pins 105 provided on the members 102, 104 and passing into the transverse portion 54.

Figure 11:
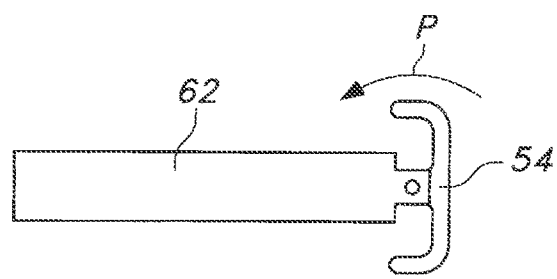
FIG. 11 is a cutaway side view of the ladder, illustrating the pivoting capabilities of a transverse portion for forming the retractable bed extender.

It can be further appreciated that, as a result of this arrangement, the entire retractable bed extender 200 may be extended and retracted without disconnecting the transverse portion 54 for use as a step (see action arrow A in FIG. 4). When deployment of the ladder 22 is desired, the transverse portion 54 may simply be disconnected from members 102, 104, such as by raising it slightly, including by way of pivoting (see arrow P in FIG. 11), and the members then adjusted if necessary to allow the transverse portion to move downwardly to the lowered position shown in FIG. 4. The portions 102a, 104a of members 102, 104 may then be extended and pinned in place to complete the transformation to a configuration that facilitates stepping into the bed 26 using the transverse portion 54, including as modified using the flip step 153.

Referring to FIGS. 12 and 13, it is also possible to form the retractable bed extension 200 without using the ladder 22. Specifically, in a situation where ladder 22 is absent, the members 102, 104 may be extended and a separate, removable support may be associated with the members in the extended position. This removable support may take the form of a cross bar 202, which may pass through aligned apertures 204 formed in the members 102, 104. The cross bar 202 may comprise first and second portions 202*a*, 202*b*, which may be removably connected together, such as by threaded engagement, and which may each further include an oversized head 206.

Once positioned spanning the extended portions 102*a*, 104*a* of the members 102, 104, the cross bar 202 may then be fixed in place. When not in use, the cross bar 202 may be disassembled and stowed within a corresponding cavity formed in the tailgate 20, such as the one that would normally receive parts of the ladder 22. The extendable members 102, 104 may also be mounted for pivoting movement when the portions 102*a*, 104*a* are extended, as noted above, such that the cross bar 202 could be used as a step when in a pivoted or lowered position. The cross bar 202 may also be used in connection with the extendable members 102, 104 when a ladder 22, if present, is in the retracted position.

As with moldings 50, 52, the transverse portion 54 of ladder 22 may be molded with the plastic being the desired final color so that it does not have to be painted. This transverse portion 54 may also include a pocketed handle 94 that provides for ease of gripping and pivoting the transverse portion 54 when deploying the ladder 22. The transverse portion 54 also may have an overall width that is just smaller than a gap 43 formed between the two tailgate moldings 50, 52, and a top surface flush with the corresponding surfaces of the tailgate moldings 50, 52.

Additionally, if so desired, the two tailgate moldings 50, 52 may include recessed flanges (not shown) that nest under the edges of the transverse portion 54. Accordingly, the transverse portion 54 of the ladder 22, when in its fully retracted position, blends in with the tailgate 20. Thus, the ladder 22 may be included without detracting from the esthetically pleasing look of the vehicle 24, and still allows the sliding of cargo into and out of the bed 26 over the top of a closed tailgate 20 without creating paint scratch concerns.

According to one aspect of the disclosure, and with reference to FIGS. 3, 4, 9, 12 and 14, the tailgate 20 of the vehicle 24 may be provided with a sawhorse 300 (which is a freestanding structure for supporting one or more workpieces above the ground, and is described in more detail below) that forms an integrated portion of the vehicle (and is thus distinguished from the positioning of a sawhorse in the bed 26 for transport, even if tied to the vehicle). In one embodiment, and with reference to FIGS. 3, 4, 9, and 12, the sawhorse 300 in a collapsed configuration may be recessed within a cavity or recess 20*a* (see FIGS. 4 and 15) formed in the tailgate 20 and, in particular an upper face thereof when in the lowered position (and the rear face in the raised or erect condition). In such a configuration, the sawhorse 300 may form an upper portion or surface of the tailgate 20, and may be arranged to avoid interfering with any retractable ladder 22 if present (such as by being inboard of the supports 62.

As can be understood by viewing FIGS. 4 and 14, the recess 20*a* may be sized and shaped to correspond to a cross member 302 of the sawhorse 300, which may be hollow for receiving the folding legs 304 in a stowed configuration. As indicated in FIG. 14, the legs 304 may be mounted in spaced pairs and adapted for pivoting from within a recess formed by the at least partly hollow interior of the cross member 302 (which may be a generally rectangular structure) and back (see double headed action arrow D). Each pair of legs 304 may be associated with hinges 306 for folding (note arrow E) to help secure the sawhorse 300 in the erect condition when the legs are spread to lend stability.

As can be appreciated, the cross member 302 may be made to match the appearance of the surrounding tailgate 20 so as to provide an aesthetically pleasing appearance, such as by matching the colors of the structures. The cross member 302 may also be provided with one or more handles 307, which may be recessed in a non-deployed configuration within the cross member 302 and adapted for pivoting for lifting the sawhorse 300 from the recess 20*a*. Alternatively, the recess 20*a* may be oversized so that an at least finger-sized gap exists to allow for manual grasping and lifting of the sawhorse 300.

Figure 9:
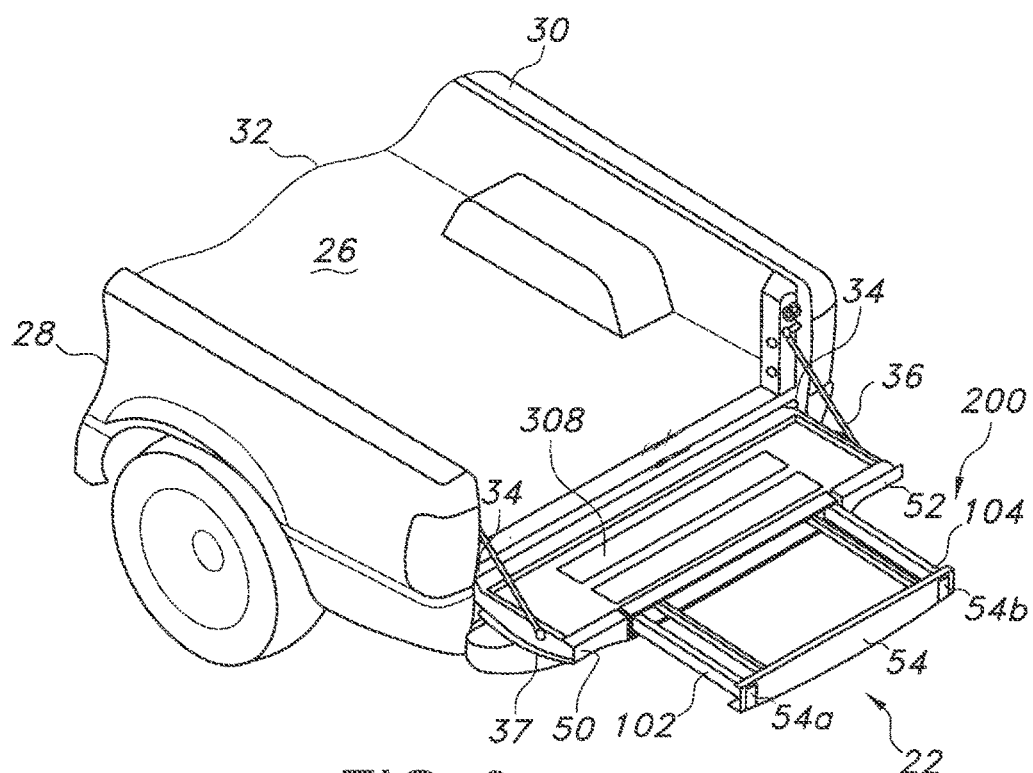
FIG. 9 is a partially cutaway perspective view of the vehicle bed taken from the rear, illustrating a retractable bed extender formed from the combination of the handles and the ladder when connected in a common horizontal plane.

In an alternative embodiment, as shown in FIG. 9, a cover 308 may be provided for covering the sawhorse 300 in the integrated, stowed condition in the tailgate 20. The cover 308 may be pivotally connected to the tailgate 20, and thus may be lifted to provide access to the sawhorse 300. Once removed, the cover 308 may be returned to a position covering the cavity or recess 20*a* (and a suitable gap may be provided to ensure that the cover 308 is flush with the surrounding portion of the vehicle, such as the rear surface of the tailgate 20). A lock (not shown) may also be provided to prevent theft of the sawhorse 300, which may be provided as part of the cover 308 or else directly as part of the sawhorse 300.

As can be appreciated, multiple sawhorses may also be provided on the tailgate 20, as indicated in FIGS. 3, 4, 9, and 12. If the tailgate 20 is of sufficient width, plural sawhorses 300 may also be recessed within a single recess 20*a* in a stacked configuration.

The sawhorse 300 may also be recessed within the tailgate 20 for being withdrawn in a horizontal manner in a transverse direction T, as shown in FIG. 15 (note partial withdrawal along left hand side, as well as vertical direction Y and travel direction X). A suitable latch, cap or plug (not shown) may be provided for preventing unintended release from the stowed position. Of course, the positioning should be such as to avoid interference with any retractable ladder 22 or extendable bed, if present. Two of the sawhorses 300 may be provided in an opposed fashion, as indicated.

The components of the sawhorse 300 may be fabricated of the same or different materials. For instance, the cross member 302 may comprise a hard plastic material that can be colored to match the surrounding portion(s) of the tailgate 20, which would contribute only minimally to weight and provide a durable surface for supporting one or more workpieces (e.g., boards for being cut). The legs 304 may be made of lightweight metal, such as aluminum of stainless steel, to provide for stability without contributing excessively to weight. Of course, plastics could also be used for the legs 304 and metal used for the cross member 302.

In summary, numerous benefits are provided by providing a vehicle 24 such as a truck with an integrated sawhorse 300 in the tailgate 20. By providing the sawhorse 300 such that it is in a recessed location in the tailgate 20, it does not occupy precious space in the bed 26 for storing objects, thus keeping the floor 32 exposed for use. Yet, the sawhorse 300 may be readily deployed from an integrated condition for use on a job or construction site. Providing the sawhorse 300 as an integral part of the rear face of the tailgate 20 also allows for the upper portion to include a retractable step or ladder 22 that may also be used to form a bed extension 200, thus enhancing the functionality. Matching the appearance of any exposed part of the sawhorse 300 to the surrounding portion of the vehicle provides an aesthetically pleasing arrangement. Furthermore, the sawhorse(s) 300 may be kept out of sight when not in use, leading to a tidier appearance.

While one embodiment of a ladder 22 is described above, a further description of similar arrangements may be found in U.S. Pat. Nos. 6,918,624, 7,090,276, and 7,234,749, the disclosures of which are incorporated herein by reference. The disclosures of U.S. Pat. Nos. 7,488,021, 7,267,387, and 9,302,719 are also incorporated herein by reference.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for a vehicle, comprising:
   a vehicle tailgate having a recess formed therein; and
   a sawhorse adapted for positioning in the recess in a stowed position and for being removed for use apart from the vehicle;
   wherein the sawhorse forms an upper surface of the vehicle tailgate when positioned in the recess.

2. The apparatus of claim 1, wherein the recess is provided in an upper portion of the tailgate.

3. The apparatus of claim 1, wherein the sawhorse comprises a cross member forming the upper surface of the tailgate and a plurality of legs stowable within the cross member.

4. The apparatus of claim 3, wherein the cross member is color matched with a surrounding portion of the tailgate.

5. The apparatus of claim 1, wherein the recess is adapted for receiving the sawhorse in a direction transverse to a vertical direction and a travel direction of the vehicle.

6. The apparatus of claim 1, wherein the vehicle tailgate includes a retractable ladder.

7. The apparatus of claim 1, wherein the vehicle tailgate includes an extendable bed.

8. The apparatus of claim 1, wherein the sawhorse includes a projecting handle for use in lifting the sawhorse from the recess.

9. A vehicle including the apparatus of claim 1.

10. A vehicle comprising a collapsible, removable sawhorse forming an integral portion of a vehicle tailgate, the sawhorse comprising a cross member and a plurality of legs depending therefrom in a deployed condition of the sawhorse;
    wherein the cross member forms an upper surface of the vehicle tailgate.

11. The vehicle of claim 10, wherein the plurality of legs are pivotally connected to the cross member.

12. The vehicle of claim 10, wherein at least two of the plurality of legs are connected by a folding hinge.

13. The vehicle of claim 10, wherein the cross member includes a recess for receiving the plurality of legs in a stowed position.

14. The vehicle of claim 10, wherein the vehicle tailgate further includes a retractable ladder.

15. The vehicle of claim 10, wherein the sawhorse includes a projecting handle for use in lifting the sawhorse from the vehicle tailgate.

* * * * *